Sept. 22, 1959  G. R. WOOD, SR  2,904,885
COMPASS VISUALIZER
Filed April 4, 1958  2 Sheets-Sheet 1

INVENTOR.
GEORGE R. WOOD, SR.
BY
McMorrow, Berman + Davidson
ATTORNEYS

Sept. 22, 1959     G. R. WOOD, SR     2,904,885
COMPASS VISUALIZER
Filed April 4, 1958     2 Sheets-Sheet 2
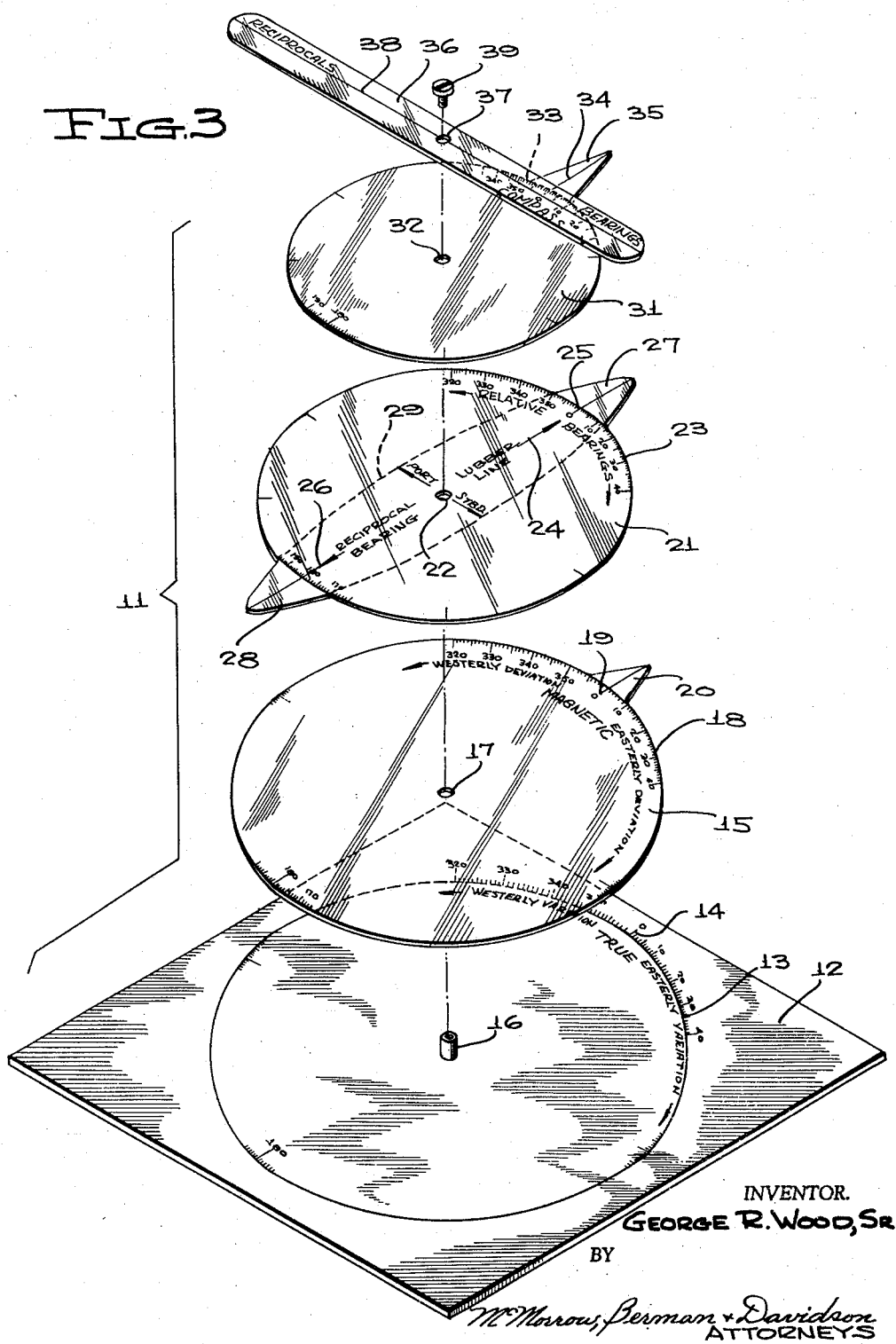
INVENTOR.
GEORGE R. WOOD, SR.
BY
McMorrow, Berman + Davidson
ATTORNEYS

United States Patent Office 2,904,885
Patented Sept. 22, 1959

2,904,885

COMPASS VISUALIZER

George R. Wood, Sr., Fairhope, Ala.

Application April 4, 1958, Serial No. 726,373

1 Claim. (Cl. 33—1)

This invention relates to a device to be employed in conjunction with a magnetic compass, and more particularly to a device to assist amateur and professional boatmen in understanding the principles and application of the magnetic compass as applied to small boat piloting.

A main object of the invention is to provide a novel and improved device for reading bearings in conjunction with a magnetic compass and for facilitating the use of a magnetic compass, especially as applied to small boat piloting, said device being simple in construction, being easy to use, and enabling compensation to be made for factors such as magnetic deviation and magnetic variation when determining a compass or magnetic course corresponding to a given true course, or vice versa.

A further object of the invention is to provide an improved device for reading bearings in conjunction with a magnetic compass, said device involving relatively inexpensive components, being durable in construction, and being relatively compact in size.

Further objects and advantages of the invention will become apparent from the following description and claim, and from the accompanying drawings, wherein:

Figure 3 is a perspective view showing the components of the compass visualizer of Figures 1 and 2 in separated positions.

Figure 1:
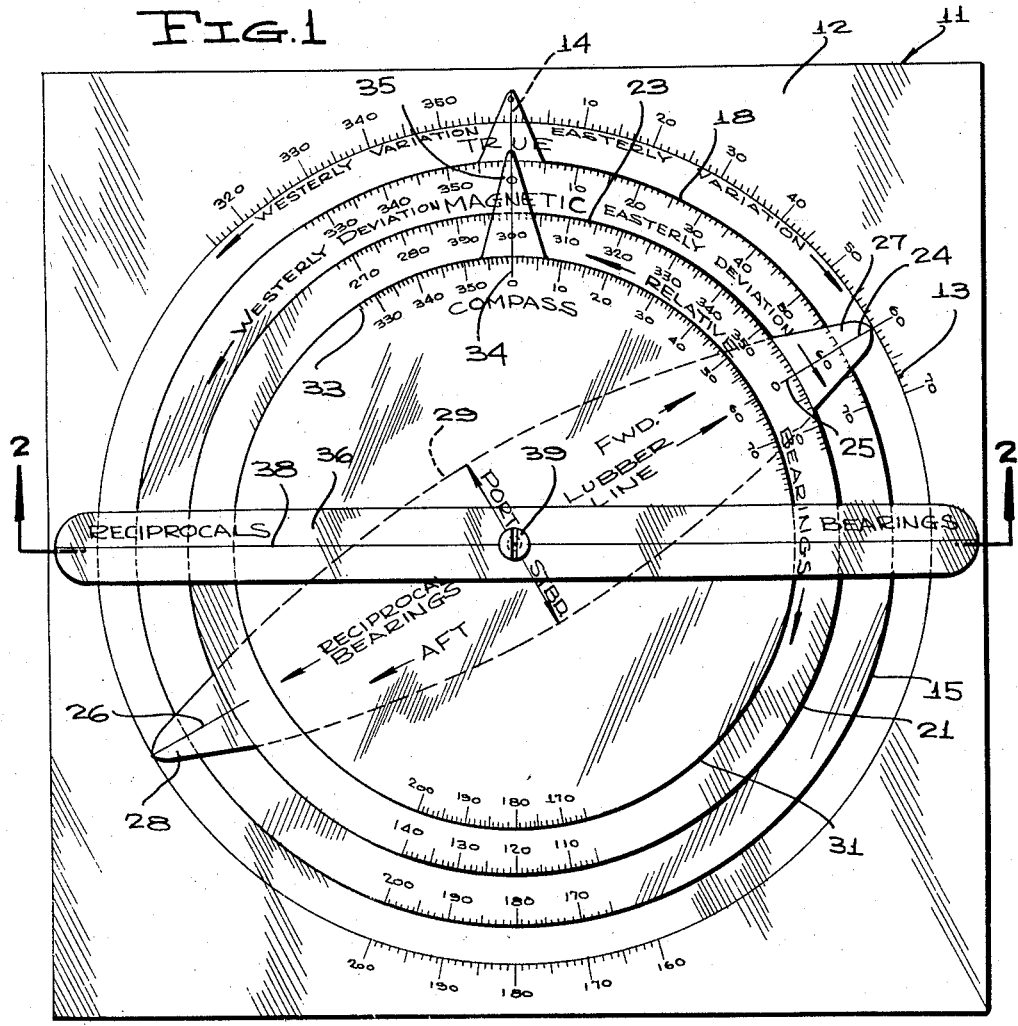
Figure 1 is a top plan view of an improved compass visualizer constructed in accordance with the present invention.
Figure 2:
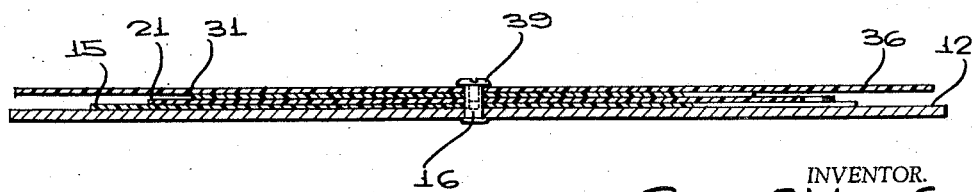
Figure 2 is a vertical cross sectional view taken on the line 2—2 of Figure 1.

Referring to the drawings, 11 generally designates a device for reading bearings in conjunction with a magnetic compass, constructed in accordance with the present invention. The device 11, which may be described as a "compass visualizer," comprises a base card 12, of any suitable shape, for example, of square shape, as illustrated, is provided with a circular scale 13 graduate in degrees and having a zero index point 14 to which variation of a magnetic compass may be referred, namely, the angle which a magnetic needle makes with a geographic meridian. As shown, the scale 13 may be employed to designate variation on either side of the zero index marker 14, for example, Easterly variation is measured on the right side of the marker 14 and Westerly variation is measured on the left side of the marker 14, as viewed in Figure 3. As will be presently explained, the scale 13 is employed to designate the "True Course" of the craft on which the device is employed.

Designated at 15 is a first disc member of transparent material which is concentrically pivoted to the card 12, for example, by being centrally engaged on an upstanding central rivet member 16 engaged centrally through the card 12 and projecting upwardly therefrom, the rivet member 16 being located at the center of the circular scale 13. The disc member 15 is slightly smaller in diameter than the circular scale 13 and is formed with the central aperture 17 adapted to receive the rivet 16. The disc member 15 is provided with a peripheral scale 18 graduated in degrees and having a zero index point 19 to which magnetic compass deviation of the magnetic compass associated with the craft may be referred.

As will be readily understood by those skilled in the art, "deviation" represents the angular error of the needle of a magnetic compass caused by the presence of iron or other magnetic material on the craft associated with the compass.

The deviation to the right of the index line 19 is considered as "Easterly" deviation, whereas the deviation to the left of the index line 19 is considered as "Westerly" deviation, as illustrated in Figures 1 and 3.

The first disc member 15 is formed adjacent the zero marker 19 with a generally triangular radial pointer element 20, projecting from the periphery of said disc member 15 and extending over the circular scale 13 on card 12. The pointer element 20 is preferably integral with the disc member 15, which is of transparent material, so that the pointer element 20 does not interfere with the visibility of the circular scale 13.

As is clearly shown in Figure 3, the radial zero line 19 on disc member 15 extends centrally along the triangular pointer element 20 and terminates at the apex of said pointer element.

Designated at 21 is a second disc member which is slightly smaller in diameter than the first disc member 15 and which is formed with a central aperture 22 adapted to receive the rivet 16, whereby the disc member 21 will be concentrically pivoted relative to the scale 13 in overlying relationship to the disc member 15. The second disc member 21 is provided with a peripheral scale 23 graduated in degrees and having the first radial Lubber Line 24 inscribed thereon and extending through the zero index point 25 of the scale 23. Diametrically aligned with the Lubber Line 24 is the reciprocal Lubber Line 26 which is therefore angularly spaced by 180° from the zero line 24. Respective generally triangular pointer projections 27 and 28 are integrally formed on the disc member 21, said projections 27 and 28 being of substantial length, and being of sufficient length to overlie the scale 18 of disc member 15 and terminating adjacent the scale 13 on the card 12. The lines 25 and 26 extend centrally through the projections 27 and 28. The projections 27 and 28 represent the forward and aft ends of the craft with which the device is associated, the outline of the craft being represented in dotted view at 29 to designate the manner in which the position of the craft is associated with the device when used in conjunction with a magnetic compass on the craft. The scale 23 is employed to measure off relative bearings.

Designated at 31 is a third disc member of transparent material, slightly smaller in diameter than the disc member 21 and formed with a central aperture 32 adapted to receive the pivot member 16. The disc member 31 is provided with a peripheral scale 33 graduated in degrees, similar to the graduations on the scale of a magnetic compass. The scale 33 is provided with a radial zero line 34 which extends centrally along a generally triangular pointer element 35 integrally formed on the periphery of the disc member 31 and of sufficient length to overlie the scales 23 and 18.

Designated at 36 is a pointer arm of transparent material which is formed with a central aperture 37 adapted to receive the rivet 16, whereby the arm 36 will be pivoted to the member 16 in overlying relationship to the uppermost disc member 31. The pointer arm 36 is of sufficient length to extend beyond the lowermost scale 13, and the arm 36 is centrally inscribed with a hair line 38 extending to its full length.

A headed fastening screw 39 is threadedly engaged in the top end of the rivet member 16, whereby to fasten the superimposed members 36, 31, 21, 15 and 12 in superimposed relationship whereby the members are rotatable relative to each other around the pivot member 16.

The respective disc members 15, 21 and 31 and the pointer arm 36 are preferably formed of transparent plastic material of substantial rigidity.

The scale 13 on the base card 12 is employed for all true bearings, and Easterly and Westerly variations are measured on this scale, as required.

The scale 18 on the first disc member 15 represents all magnetic bearings, and this disc member may be rotated Easterly or Westerly, as required to correct for variation, as measured off on the scale 13.

Easterly or Westerly deviation is measured off on the scale 18 of the disc member 15, in a manner presently to be described, employing the second disc member 21. The scale 23 is employed to measure off relative bearings. Boat headings or courses are read on the other scales at the Lubber Line 24.

The third disc member 31 is a representation of the compass card of the associated magnetic compass. The zero marker line 34 may be adjusted Easterly or Westerly, as required, to correct for deviation, as measured off on the scale 18 of disc member 15.

The pointer arm 36 with the hair line 38 inscribed centrally thereon, is employed for transferring relative readings from one circular scale to another.

As will be readily understood, the disc member 15 is rotated Easterly or Westerly with respect to the true course scale 13 to correct for "variation." The compass disc 31 is rotated Easterly or Westerly relative to the disc member 15 to correct for "deviation." The Lubber Line 24 is set to the known condition, which may be true bearing, compass bearing or magnetic bearing.

As an example of the manner of use of the device, let it be assumed that it is desired to determine the compass or magnetic course corresponding to a given true course. Thus, the steps involved in using the device will be as follows:

(1) The zero index line 19 of the disc member 15 is first set to the known value of variation on the scale 13 of card 12.

(2) The Lubber Line 24 on the disc member 21 is then set to the given true course on the scale 13. The magnetic course is then read directly on the scale 18 of disc member 15 at the Lubber Line 24.

(3) The compass disc 31 is then set to the known deviation, Easterly or Westerly, relative to the scale 18 on the disc member 15.

(4) The boat compass course may then be read directly on the compass disc 31 by noting the position of the Lubber Line 24 relative to the compass scale 33.

The above procedure provides a method for reproducing and visually solving all problems concerning true, magnetic, compass or relative bearings. For instance, with the above settings made, a relative bearing on disc member 21 can be lined up with the rotatable pointer member 36, and the corresponding compass, magnetic and true bearings may be read directly from the compass scale 33, magnetic bearing scale 18, and true bearing scale 13.

In a similar manner, the device of the present invention may be employed to convert from compass or magnetic bearings to true course, following a procedure generally the same as above described, as follows:

(1) The disc member 15 is set so that its index pointer 19 is positioned on scale 13 at a value corresponding to the known variation.

(2) The compass disc 31 is adjusted so that its pointer element 34 is set to the proper value of deviation on the scale 18 of the disc member 15.

(3) The Lubber Line 24 on disc member 21 is set to the given compass course on the scale 33 of disc member 31.

(4) The required magnetic and true courses are then read directly from the Lubber Line on the scales 18 and 13.

While a specific embodiment of an improved device for reading bearings in conjunction with a magnetic compass has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A device for reading bearings in conjunction with a magnetic compass comprising a base card provided with a circular scale graduated in degrees and having a zero point to which magnetic compass variation may be referred, a first disc member slightly smaller in diameter than and concentrically pivoted to said base card and provided with a peripheral scale graduated in degrees and having a zero point to which magnetic compass deviation may be referred, a radial pointer element on the periphery of said first disc member at the zero point of its scale and extending over the first-named scale, a second disc member slightly smaller in diameter than said first disc member and concentrically pivoted to said base card and overlying said first disc member, said second disc member being provided with a peripheral scale graduated in degrees and having a radial Lubber Line inscribed thereon at the zero point of said last-named scale, a radial pointer element on the periphery of said second disc member at the zero point of its scale, said last-named pointer element including a portion of said Lubber Line and being of sufficient length to extend over the scale of the first disc member and adjacent said first-named scale, a third disc member slightly smaller in diameter than said second disc member and concentrically pivoted to said base card over said second disc member and provided with a peripheral scale graduated in degrees, a radial pointer element on the periphery of said third disc member and being of sufficient length to extend over the scales of both the first and second disc members, and a pointer arm concentrically pivoted to said base card over said third disc member and having a radial index line extending over the respective peripheral scales of the disc members and said first-named scale.

References Cited in the file of this patent

UNITED STATES PATENTS

| | | |
|---|---|---|
| 1,311,641 | Christensen | July 29, 1919 |
| 1,949,946 | Viehmann | Mar. 6, 1934 |
| 2,007,986 | Sprague | July 16, 1935 |
| 2,477,556 | Shaw | July 26, 1949 |